(12) United States Patent
Xie et al.

(10) Patent No.: US 11,392,172 B2
(45) Date of Patent: Jul. 19, 2022

(54) INFORMATION PROCESSING METHOD, WEARABLE ELECTRONIC DEVICE, ELECTRONIC DEVICE AND STORAGE MEDIUM

(71) Applicant: BEIJING XIAOMI MOBILE SOFTWARE CO., LTD., Beijing (CN)

(72) Inventors: Yingchun Xie, Beijing (CN); Zheng Xing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/021,950

(22) Filed: Sep. 15, 2020

(65) Prior Publication Data

US 2021/0341965 A1 Nov. 4, 2021

(30) Foreign Application Priority Data

Apr. 29, 2020 (CN) .......................... 202010356985.7

(51) Int. Cl.
 *G06F 1/16* (2006.01)
 *H04W 4/80* (2018.01)

(52) U.S. Cl.
 CPC ............... *G06F 1/163* (2013.01); *H04W 4/80* (2018.02)

(58) Field of Classification Search
 CPC ......... H04M 1/72412; H04M 1/72409; H04W 68/02; G06F 1/163; G06F 3/011; G06F 3/0227
 See application file for complete search history.

(56) References Cited

U.S. PATENT DOCUMENTS

| 10,387,020 | B2 | 8/2019 | Cauwels et al. |
| 2013/0120106 | A1 | 5/2013 | Cauwels |
| 2014/0372940 | A1 | 12/2014 | Cauwels et al. |
| 2015/0122887 | A1 | 5/2015 | Morris et al. |

(Continued)

FOREIGN PATENT DOCUMENTS

| CN | 109191680 A | 1/2019 |
| JP | 2000259577 A | 9/2000 |
| WO | 2014006417 A1 | 1/2014 |

OTHER PUBLICATIONS

Partial Supplementary European Search Report in the European application No. 20198471.3, dated Mar. 15, 2021.

(Continued)

*Primary Examiner* — Robert J Michaud
(74) *Attorney, Agent, or Firm* — Syncoda LLC; Feng Ma

(57) ABSTRACT

A wearable electronic device includes: a body and a connector. The body includes a display component. A display area of the display component is on the surface of the body and is configured to output display contents. The connector has a first accommodating space. When the body is fixed with the connector, the body is in the accommodating space. The connector can form a wearing ring. When the first accommodating space is empty, the body is separated from the connector. A first communication component is disposed in the body, and is configured for the communication between the body and external devices. A second communication component independent of the first communication component is disposed in in the connector, and is configured for the communication between the connector and external devices.

18 Claims, 13 Drawing Sheets

(56) References Cited

U.S. PATENT DOCUMENTS

| | | | |
|---|---|---|---|
| 2015/0341386 A1* | 11/2015 | Bergman | H04L 67/2852 726/3 |
| 2016/0157590 A1 | 6/2016 | Anderson | |
| 2017/0046054 A1 | 2/2017 | Cauwels et al. | |
| 2017/0277850 A1 | 9/2017 | Anderson | |
| 2018/0157401 A1* | 6/2018 | Cauwels | A61B 5/14532 |
| 2020/0073337 A1 | 3/2020 | Wang | |
| 2020/0326661 A1 | 10/2020 | Wang | |
| 2020/0326662 A1 | 10/2020 | Wang | |
| 2020/0326663 A1 | 10/2020 | Wang | |

OTHER PUBLICATIONS

European Search Report in the European application No. 20198471.3, dated Jul. 19, 2021.

* cited by examiner

INFORMATION PROCESSING METHOD, WEARABLE ELECTRONIC DEVICE, ELECTRONIC DEVICE AND STORAGE MEDIUM

CROSS-REFERENCE TO RELATED APPLICATION

This application claims priority to Chinese Patent Application No. 202010356985.7 filed on Apr. 29, 2020, the disclosure of which is hereby incorporated by reference in its entirely.

BACKGROUND

With development of electronics technologies, more and more types of electronic products are applied. More and more people use wearable electronic devices because they are easy to carry. Taking that a wearable electronic device is a smart electronic watch for example, many parents equip their children with smart electronic watches in order to ensure safety of children and keep track of their children at any time.

SUMMARY

The present disclosure relates to the field of computer communications, and more particularly to a method for information processing, a wearable electronic device, an electronic device, and a storage medium.

According to a first aspect of these embodiments of the present disclosure, a wearable electronic device may include: a body which includes a display component and a connector, which has a first accommodating space. A display area of the display component is on a surface of the body and is configured to output display contents.

When the body is fixed with the connector, the body is in the accommodating space. The connector can form a wearing ring. When the first accommodating space is empty, the body is separated from the connector. A first communication component is arranged in the body and is configured for the communication between the body and external devices. A second communication component is arranged in the connector and is independent of the first communication component, and is for communication between the connector and external devices.

According to a second aspect of these embodiments of the present disclosure, an electronic device is provided, which may include:

a plurality of second accommodating spaces, each configured to accommodate the body of the wearable electronic device;

a third communication component, configured to establish the communication connection with the body when the body is arranged in the second accommodating space.

According to a third aspect of these embodiments of the present disclosure, a method for information processing is applicable to the electronic device in the second aspect, and may include that:

it is determined whether the communication connection between the electronic device and the body of the wearable device is established successfully; and when the communication connection between the electronic device and the body is established successfully, the first prompt message is sent to the terminal device.

According to a fourth aspect of these embodiments of the present disclosure, a non-transitory computer-readable storage medium has stored instructions therein that, when executed by a processor of an electronic device, cause the electronic device to implement the method for information processing in the third aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
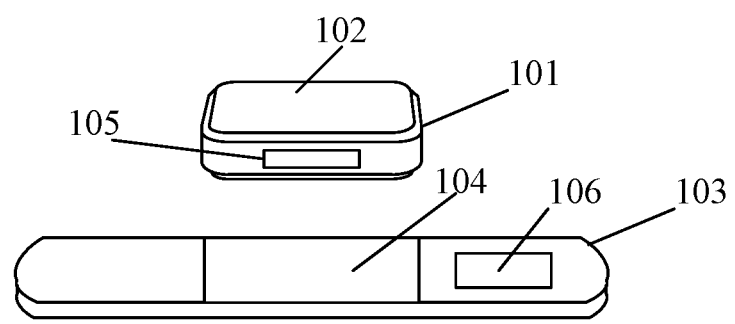
FIG. 1 is a first structure diagram of a wearable electronic device according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure.

Rather, they are merely examples of the apparatus and method in accordance with certain aspects herein as recited in the accompanying claims.

The terms used in the present disclosure are for describing particular embodiments only, and are not intended to limit the present disclosure. The singular forms "a/an," "the" and "this" used in the present disclosure and the appended claims are also intended to include the plural forms unless the context clearly indicates other meanings. It is to be understood that the term "and/or" as used herein refers to and includes any or all possible combinations of one or more associated listed items.

It is to be understood that although the terms first, second, third, etc. may be used to describe various information in the present disclosure, the information should not be limited to these terms. The terms are only used to distinguish the same type of information from each other. For example, without departing from the scope of the present disclosure, the first information may also be referred to as second information, and similarly, the second information may also be referred to as first information. Depending on the context, the word "if" as used herein may be interpreted as "during" or "when" or "in response to determination."

Sometimes students may bring smart electronic watches to school, but are not allowed to use the smart electronic watches in public due to possible interference with normal studying and teaching order. As a result, many students are restricted from using smart electronic watches at school, or have to use the smart electronic watches secretly. As a result, parents cannot keep track of their children through the smart electronic watches.

FIG. 1 is a first structure diagram of a wearable electronic device according to some embodiments of the present disclosure. As shown in FIG. 1, the wearable electronic device may include:

a body 101, which includes a display component 102. A display area of the display component 102 is on the surface of the body 101 and is configured to output display contents; and a connector 103, which has a first accommodating space 104.

When the body 101 is fixed with the connector 103, the body 101 is arranged in the accommodating space 104. The connector 103 can form a wearing ring. When the first accommodating space 104 is empty, the body 101 is separated from the connector 103.

A first communication component 105 is arranged in the body 101 and is configured for communication between the body 101 and external devices.

A second communication component 106 is arranged in the connector 103 and is independent of the first communication component 105. The second communication component 106 is configured for communication between the connector 103 and external devices.

The wearable electronic device may be a portable electronic device that can be worn by a user or integrated into the user's clothing or accessories. For example, wearable electronic devices may include: an electronic watch supported by a wrist and includes a dial and a strap, or shoes and socks supported by a foot, or an electronic device that can be worn on a leg, or glasses, helmets, headbands and others supported by a head, or smart clothing, bags, crutches, accessories, etc.

In the embodiments of the present disclosure, the wearable electronic device may have the body 101 and the connector 103. The body 101 may include the display component 102. The display area of the display component 102 may be on the surface of the body 101 and is configured to output the display contents. The connector 103 and the body 101 of the wearable electronic device involved in these embodiments of the present disclosure may be connected detachably. Because there is the first accommodating space 104 on the connector 103, the body 101 of the wearable electronic device during use may be arranged in the first accommodating space 104. In this way, the body 101 can be fixed on the connector 103. The connector 103 can form a wearing ring, therefore, when the body 101 of the wearable electronic device is fixed on the connector 103, the wearable electronic device with the body 101 may be fixed on the user's body through the wearing ring formed by the connector 103.

In an optional embodiment, when the first accommodating space on the connector is empty, it means that the body is not arranged in the first accommodating space. In this case, the body of the wearable electronic device and the connector are separated. When the body of the wearable electronic device is separated from the connector, the connector can also be fixed on the user's body through the wearing ring formed by the connector.

Figure 2:
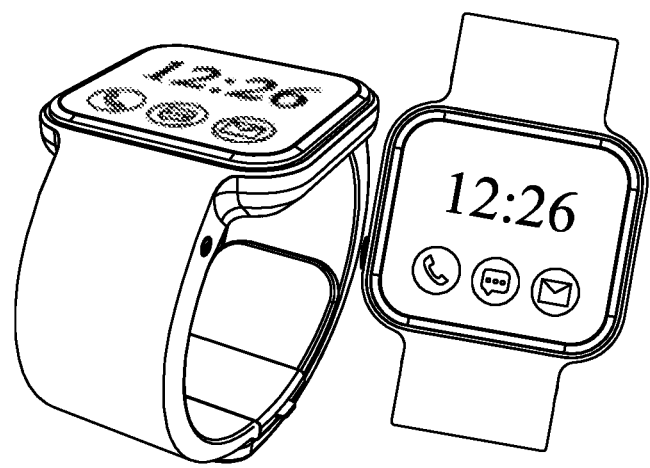
FIG. 2 is a schematic diagram of a smart electronic watch according to some embodiments of the present disclosure.

The body 101 has the first communication component 105 for communicating with external devices, and the connector 103 has the second communication component 106 for communicating with external devices, therefore, the body 101 and the connector 103 also can communicate with external devices respectively based on the first communication component 105 and the second communication component 106 after the body 101 and the connector 103 are separated. The wearable electronic device may be a smart electronic watch. In this case, the body 101 of the wearable electronic device may include the dial of the smart electronic watch, while the connector 103 may include the strap of the smart electronic watch. FIG. 2 is a schematic diagram of a smart electronic watch according to some embodiments of the present disclosure.

In an optional embodiment, the wearable electronic device may also be a portable electronic device supported by the neck. In this case, the body of the wearable electronic device may be a pendant, while the connector may be a necklace that can form the wearing ring. During use, the pendant may be hung around the user's neck through the necklace that forms the wearing ring.

Figure 3:
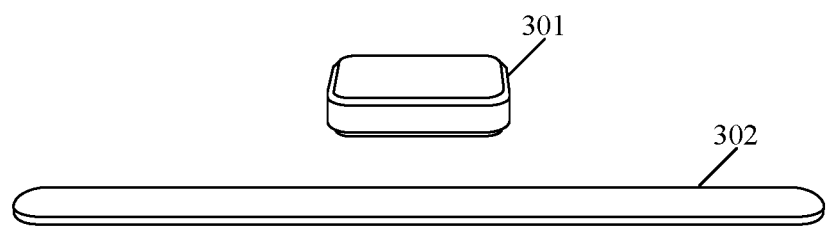
FIG. 3 is a structure diagram of a smart electronic watch according to some embodiments of the present disclosure.

Taking that the wearable electronic device is a smart electronic watch as an example, FIG. 3 is a structure diagram of a smart electronic watch according to some embodiments of the present disclosure. As shown in FIG. 3, the smart electronic watch may include a body 301 and a connector 302. A display screen is arranged on the surface of the body 301 of the smart electronic watch and is for outputting display contents. There is a first communication component arranged on the body 301, and there is a second communication component arranged on the connector 302. The first communication component may be a NFC component and is configured to perform NFC between the smart electronic watch and external devices. For example, the first communication components may be a Bluetooth communication component, a ZigBee communication component, and so on. In some embodiments, the first communication component may also be a remote communication component and is configured to perform remote communication between the smart electronic watch and external devices. For example, when the first communication component is a Wireless Fidelity (Wi-Fi) communication component, the body 301 may communicate with external devices, so as to realize data transmission.

In the case of students using smart electronic watches, since school does not allow students to use the smart electronic watches, the body of the smart electronic watch may be removed from the first accommodating space of the connector and handed over to the administrator after the student arrives at school, and the connector can continue being worn on the wrist. The connector has the second communication component for communicating with external devices, therefore, some functions of the smart electronic watch can be normally used. The administrator still can send the students' situations at school to parents through the first communication component on the body.

In some embodiments, if a user wearing the wearable electronic device needs to enter a place with high confidentiality requirements, the user may also remove the body of the wearable electronic device from the connector, and then enter the place wearing the connector. In this way, the function of the connector can be continued on the basis of meeting the confidentiality requirements.

In these embodiments of the present disclosure, the first accommodating space is arranged on the connector of the wearable electronic device to place the body of the wearable electronic device. In the first aspect, the connector can form a wearing ring separately after the body is removed, therefore, the connector can be worn normally even if the body is removed from the first accommodating space on the connector. In the second aspect, the body has the first communication component, the connector has the second communication component, and the first communication component and the second communication component are independent of each other, therefore, the body and the connector can work normally as two independent parts even if the body and the connector are separated. In the third aspect, a user can decide to carry the body and/or the connector according to different application scenarios, which can improve the flexibility of using the wearable electronic device and thus improve the user experience.

In some embodiments, the first communication component is further configured to establish a communication connection between the body and a first external device when the body is arranged in a second accommodating space on the first external device.

Since there is the first communication component arranged on the body of the wearable electronic device, when the body of the wearable electronic device is used alone, the body may be arranged in the second accommodating space of the first external device, so as to establish the communication connection between the body and the first external device. Taking that the first communication component is a Bluetooth communication component and there is a Bluetooth component arranged in the first external device, the body may be arranged in the second accommodating space of the first external device during use. In this case, a Bluetooth connection between the body and the first external device may be established based on the Bluetooth communication component of the body and the Bluetooth component of the first external device, so as to perform data transmission.

In some embodiments, a first contact point may also be set in the second accommodating space of the first external device, and a second contact point may also be set on the body of the wearable electronic device. In this case, after the body is arranged in the second accommodating space, the first contact point may come into contact with the second contact point to form an electrical connection between the body and the first external device. After the electrical connection is formed, the data transmission between the body of the wearable electronic device and the first external device may be realized.

Figure 4:
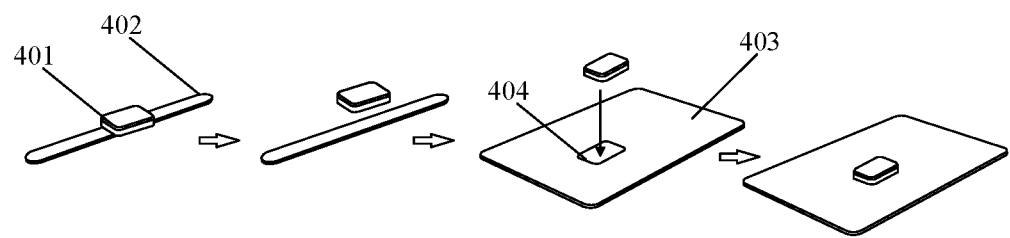
FIG. 4 is a second structure diagram of a wearable electronic device according to some embodiments of the present disclosure.

FIG. 4 is a second structure diagram of a wearable electronic device according to some embodiments of the present disclosure. As shown in FIG. 4, the wearable electronic device may include a body 401 and a connector 402. During use, the body 401 may be removed from the connector 402 and arranged in the second accommodating space 404 of the first external device 403, so as to establish a communication connection between the body 401 and the first external device 403.

Still taking that the wearable electronic device is the smart electronic watch as an example. After a student hands over the body of the smart electronic watch to a administrator, the administrator may place the body of the smart electronic watch in the second accommodating space of the first external device, so as to establish a communication connection between the body and the first external device.

In the embodiments of the present disclosure, when the body of the wearable electronic device is separated from the connector, the body of the wearable electronic device may be placed in the second accommodating space of the first external device, and a communication connection between the body and the first external device can be established based on the first communication component of the body. In this way, even if the body of the wearable electronic device is separated from the connector, the body and the first external device can communicate normally, and the flexibility of using the wearable electronic device can be improved.

In some embodiments, the first external device may also be an attendance device or a check-in device. A second accommodating space may be set on the attendance device or the check-in device. In the implementation process, the body of the wearable electronic device may be arranged in the second accommodating space of the attendance device or the check-in device. A communication connection between the body and the attendance device or the check-in device may be established. After the communication connection is established successfully, the attendance device or the check-in device can directly acquire attendance information or check-in information. By applying the wearable devices to an attendance system or a check-in system, the efficiency of attendance recording and check-in can be improved.

In some embodiments, the body may further include:

a first processing component, configured to switch the body from a first operating mode to a second operating mode after the body establishes the communication connection with the first external device.

Functions that the body can perform in the second working mode are fewer than functions that the body can perform in the first operating mode.

Still taking that the wearable electronic device is the smart electronic watch as an example. After a student hands over the body of the smart electronic watch to a teacher or other administrators, the administrators may place the body of the smart electronic watch in the second accommodating space of the first external device, so as to establish the communication connection between the body and the first external device. It is needed to reduce the interference of the information received by the body of the smart watch on the student at school, therefore, it is required to switch the body of the smart watch from a normal mode (the first operating mode) to a campus mode (the second operating mode), so as to reduce the interferences of phone, SMS, Internet, entertainment and other functions on the student in class. Meanwhile, a studying function can be used normally. In these embodiments of the present disclosure, when the body of the wearable electronic device is in the first operating mode, the power consumption of the wearable electronic device is higher than that in the second operating mode. Since the second operating mode is a mode with low utilization, the wearable electronic device may enter the second operating mode with low power consumption from the first operating mode with high power consumption by disabling one or more functions of the body or reducing a working frequency of the body.

In the embodiments of the present disclosure, after the communication connection between the body and the first external device is established, the body may be switched from the first operating mode with more functions to the second operating mode with fewer functions. In this way, on the basis of ensuring the normal use of the body of the wearable electronic device, the interference of unnecessary functions on a user is reduced.

In some embodiments, the first processing component is further configured to switch the body from the second operating mode to the first operating mode after determining that the communication connection between the body and the first external device is disconnected.

Still taking that the wearable electronic device is the smart electronic watch as an example. When the communication connection between the body of the smart electronic watch and the first external device is disconnected, it means that an administrator has returned the body of the smart electronic watch to a student. In this case, the smart electronic watch may be switched from the second operating mode with fewer functions to the first operating mode with more functions in order to guarantee the normal use of the smart electronic watch.

In the embodiments of the present disclosure, after the communication connection between the body and the first external device is disconnected, the body may be automatically switched from the second operating mode with fewer functions to the first operating mode with more functions. In this way, the flexibility of using the wearable electronic device is improved while ensuring the normal use of the body of the wearable electronic device.

In some embodiments, a power supply connection between the body and the first external device may also be established, so as to charge the body through the first external device.

In some embodiments, the second communication component is further configured to establish the communication connection between the connector and a second external device when the distance between the connector and the second external device is less than a preset distance threshold.

In the embodiments of the present disclosure, a wearable electronic device may include a body and a connector. The connector and the body of the wearable electronic device may be connected detachably. When the first accommodating space on the connector is empty, it means that the body is not arranged in the first accommodating space. In this case, the body of the wearable electronic device and the connector are separated. The connector has a second communication component for communicating with an external device, therefore, when the connector of the wearable electronic device is used alone, a communication connection between the connector and the second external device can be established through the second communication component. In some embodiments, a power supply connection between the body and the second external device may also be established, so as to charge the connector through the second external device.

The second communication component may be a NFC component and may establish a communication connection between the connector and the second external device when the distance between the connector and the second external device is less than a preset distance threshold. Moreover, the connector can form a wearing ring, therefore, when the body of the wearable electronic device is separated from the connector, the connector can continue being fixed on the user's body through the wearing ring. Based on the structure of the wearable electronic device in the embodiments of the present disclosure, the connector can still be used normally when the body of the wearable electronic device is separated from the connector.

In some embodiments, the second communication component may include:

an NFC chip, configured to simulate the connector into an NFC card. The NFC card is configured to perform NFC between the NFC card and a card reading device.

The NFC chip is a chip configured to realize contactless data transmission between devices. Since the NFC chip is simple in structure, small in size and slice-shaped, it can be simply and conveniently embedded in the connector. During use, the connector may be simulated as a non-contact NFC card for use. In some embodiments, the NFC chip may be connected to memory in which authentication information is stored in advance to authenticate access permission of a user. Taking that the connector is simulated as an access control card for example. Access control authentication information may be stored in the memory for authenticating whether the user has the authority to open the access control.

In the embodiments of the present disclosure, the NFC chip may be arranged in the connector to simulate the connector as the non-contact NFC cards for use, such as an access control card, a bank card and a bus card. During use, the connector, which is simulated as the NFC card, may be placed close to the card reading device, so as to perform NFC interaction with the card reading device. The card reading device may be equipped with an NFC card swiping system, so that the card reading device can perform NFC interaction with the connector simulated as the NFC card through the NFC card swiping system. The NFC card swiping system equipped in the card reading device may be an access control system, a payment system, a public traffic system, and so on.

For example, when the NFC card swiping system equipped in the card reading device is the access control system, the connector may be simulated as the access control card. When the NFC card swiping system equipped in the card reading device is the payment system, the connector may be simulated as the bank card. When the NFC card swiping system equipped in the card reading device is the public traffic system, the connector may be simulated as the bus card.

Figure 5:
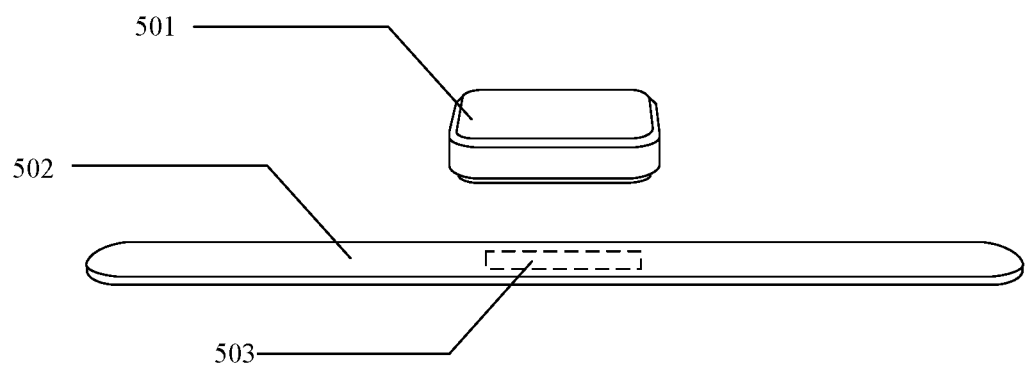
FIG. 5 is a structure diagram of a connector according to some embodiments of the present disclosure.
Figure 6:
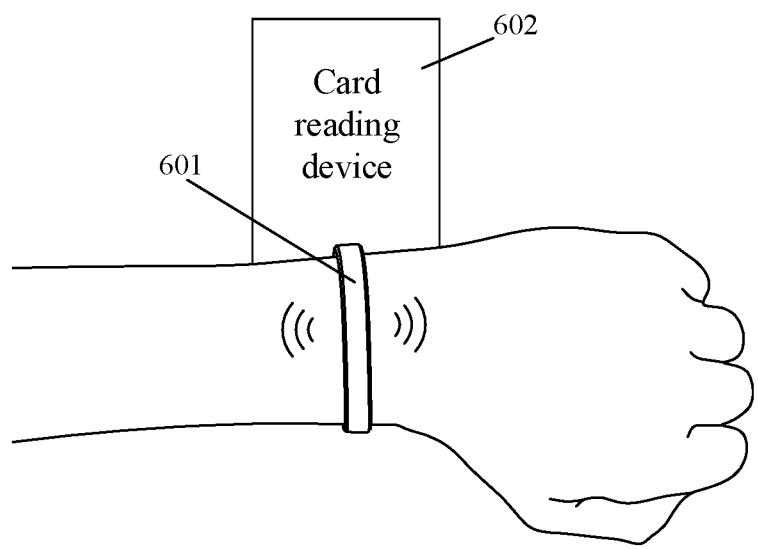
FIG. 6 is a schematic diagram of a connector in use according to some embodiments of the present disclosure.

FIG. 5 is a structure diagram of a connector according to some embodiments of the present disclosure. As shown in FIG. 5, the body 501 and the connector 502 of the wearable electronic device are separated, and the connector 502 is equipped with the NFC chip 503. FIG. 6 is a schematic diagram of a connector in use according to some embodiments of the present disclosure. As shown in FIG. 6, when the connector 601 and the body of the wearable electronic device are separated, the connector 601 may form a wearing ring surrounding a user's wrist. The connector 601 is equipped with the NFC chip, therefore, card swiping can be performed based on the NFC chip when the connector is placed near the card reading device 602 during use.

In the embodiments of the present disclosure, the connector equipped with the NFC chip may be simulated as the NFC card that may perform near field wireless communication with the card reading device. In this way, even though the body of the wearable electronic device is separated from the connector, the connector may also be used separately.

In some embodiments, the wearable electronic device may further include a fixer on the connector. The fixer is configured to lock a first fixing point and a second fixing point on the connector, so that the connector forms the wearing ring. The fixer may be a buckle structure.

In another optional embodiment, the connector may further include a detecting component. The detecting component is configured to detect, after the connector forms the wearing ring, whether the formed wearing ring is in a separated state, and when the wearing ring is in the separated state, detect whether the duration of the wearing ring in the separated state is greater than a first preset duration. The second communication component is further configured to send a third prompt message to the terminal device bound to the wearable electronic device when the duration of the wearing ring in the separated state is greater than the first preset duration.

In some embodiments, the detecting component is further configured to detect whether the first fixing point and the second fixing point on the connector are locked. When the first fixing point and the second fixing point are locked, it is determined that the connector forms the wearing ring. When the first fixing point and the second fixing point are separated, it can be determined that the wearing ring formed by the connector is in the separated state.

In some embodiments, the detecting component is further configured to detect, after the connector forms the wearing ring, whether the connector is in an immobile state. The second communication component is further configured to send a fourth prompt message to the terminal device bound to the wearable electronic device when the duration of the connector in the immobile state is greater than a second preset duration.

The second communication component may also be a remote communication component, for example, a Subscriber Identification Component (SIM) card, a Wi-Fi communication component, etc. In the embodiments of the present disclosure, when it is detected that the wearing ring formed by the connector is taken apart and the duration of such separation is greater than a first preset duration, a third prompt message may be automatically sent to the terminal device bound to the wearable electronic device. Moreover, when the duration of the connector in the immobile state is greater than a second preset duration, a fourth prompt message may be automatically sent to the terminal device bound to the wearable electronic device. In this way, when the wearing ring formed by the connector falls apart or the connector falls to the ground, a warning message can be sent to the terminal device bound to the wearable electronic device timely, so that a user holding the terminal device can know that the connector is not normally worn and make corresponding countermeasures.

Figure 7:
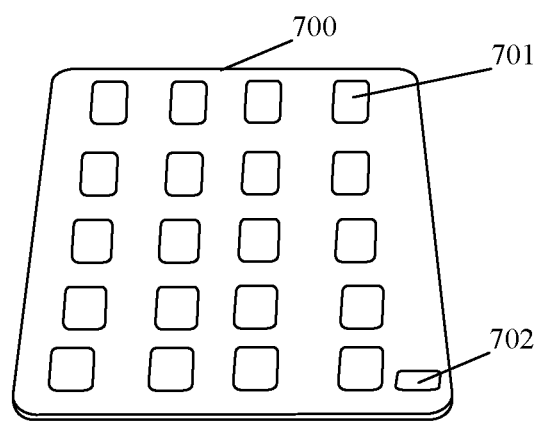
FIG. 7 is a first structure diagram of an electronic device according to some embodiments of the present disclosure.

FIG. 7 is a first structure diagram of an electronic device according to some embodiments of the present disclosure. As shown in FIG. 7, the electronic device 700 may include:

a plurality of second accommodating spaces 701, each configured to accommodate the body of the wearable electronic device; and a third communication component 702, configured to establish the communication connection with the body when the body is in the second accommodating space.

In these embodiments of the present disclosure, in order to accommodate the body removed from the wearable electronic device, the plurality of second accommodating spaces 701 may be set on the electronic device 700 to accommodate the body of the wearable electronic device. The electronic device 700 may be the first external device in the above embodiments. After the body of the wearable electronic device is placed in the second accommodating space 701 of the electronic device 700, the communication connection between the body and the electronic device 700 may be established based on the first communication component of the body and the third communication component 703 of the electronic device 700.

Figure 8:
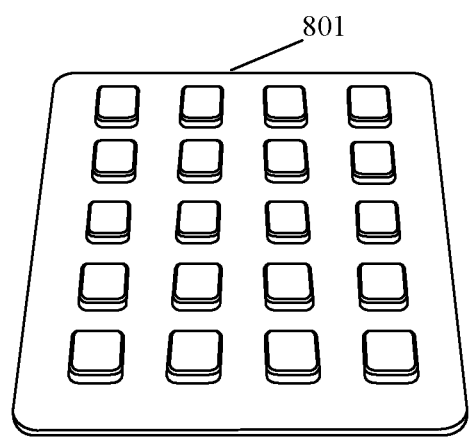
FIG. 8 is a second structure diagram of an electronic device according to some embodiments of the present disclosure.

FIG. 8 is a second structure diagram of an electronic device according to some embodiments of the present disclosure. As shown in FIG. 8, the body of the wearable electronic device is accommodated in all the second accommodating spaces of the electronic device 801.

In some embodiments, the first contact point may also be set in the second accommodating space of the electronic device, and the second contact point may also be set on the body of the. In this case, after the body is placed in the second accommodating space, the first contact point may come into contact with the second contact point to form the electrical connection between the body and the electronic device. After the electrical connection is formed, data transmission between the body of the wearable electronic device and the electronic device may be realized.

In some embodiments of the present disclosure, by setting the plurality of second accommodating spaces on the electronic device, the bodies of the plurality of wearable electronic devices may be accommodated, and the communication connection between the electronic device and each body may be established through the third communication component. In this way, the bodies of the plurality of wearable electronic devices can be controlled based on one electronic device.

In some embodiments, the electronic device may further include:

a third processing component, configured to determine whether the communication connection between the electronic device including the third communication component and the body is established successfully.

The third communication component, connected with the third processing component, is further configured to send a first prompt message to a terminal device bound to the wearable electronic device when a communication connection between the electronic device including the third communication component and the body is established successfully.

Whether the communication connection between the electronic device and the body is established successfully may be determined based on the third processing component of the electronic device. When the communication connection between the electronic device and the body is established successfully, the first prompt message may be sent to the terminal device bound to the wearable electronic device. In the embodiments of the present disclosure, the first prompt message may be either a message representing that the communication connection between the electronic device and the body is established successfully, or check-in information generated based on a state that the communication connection between the electronic device and the body is established successfully. In the implementation process, the electronic device may send the first prompt message to the terminal device through a network, for example, by a mail and a web page link. In some embodiments, the electronic device may also send the first prompt message to the terminal device through SMS.

In some embodiments, whether the electronic device receives a connection request from the body of the wearable electronic device may be determined based on the third processing component of the electronic device. A request response may be sent to the body in response to receiving the connection request. The communication connection between the body of the wearable electronic device and the electronic device may be established in response to determining that the body receives the request response.

In another optional embodiment, when the communication connection between the electronic device and the body is established based on the first contact point that is set in the second accommodating space of the electronic device and the second contact point that is set on the body of the wearable electronic device, whether the first contact point comes into contact with the second contact point may be determined based on the third processing component of the electronic device. When the first contact point comes into contact with the second contact point, it can be determined that the communication connection between the electronic device and the body is established successfully.

When the communication connection between the electronic device and the body is established successfully, the first prompt message may be sent to the terminal device bound to the wearable electronic device based on the third communication component connected with the third processing component. Taking that the wearable electronic device is the smart electronic watch used by the student for example. Since school does not allow a student to use a smart electronic watch, the student can remove the body of the smart electronic watch from the first accommodating space of the connector and hand over the body to an administrator after arriving at school. After getting the body, the administrator may place the body in the second accommodating space of the electronic device to establish a communication connection between the body and the electronic device, so as to realize the function of sending the student's situation after the body is separated from the connector. The terminal device may be an external device that is different from the body and the electronic device. For example, the terminal device may be an electronic device held by parents for receiving and displaying information sent from the electronic device of the student.

The embodiments of the present disclosure also provide a system for information processing. The system for information processing may include: the body of the wearable electronic device, the electronic device and the terminal device. In the implementation process, the body of the wearable electronic device may be arranged in the second accommodating space of the electronic device to establish the communication connection between the body and the electronic device. When the communication connection between the body and the electronic device is established successfully, the first prompt message may be sent to the terminal device.

In some embodiments, when the body of the wearable electronic device is separated from the connector, a connection request may be sent to the electronic device based on the body. The electronic device determines whether the connection request sent by the body of the wearable electronic device is received. When the electronic device receives the connection request, the electronic device may send a request response to the body. The body may establish the communication connection with the electronic device based on the request response. When the communication connection is established successfully, the electronic device may send the first prompt message indicating the successful connection to the terminal device.

In some embodiments, whether a distance between the connector and the second external device is less than a preset distance threshold may also be determined. When the distance between the connector and the second external device is less than the preset distance threshold, the communication connection between the connector and the second external device is established, and the connector may communicate with the second external device.

Figure 9:
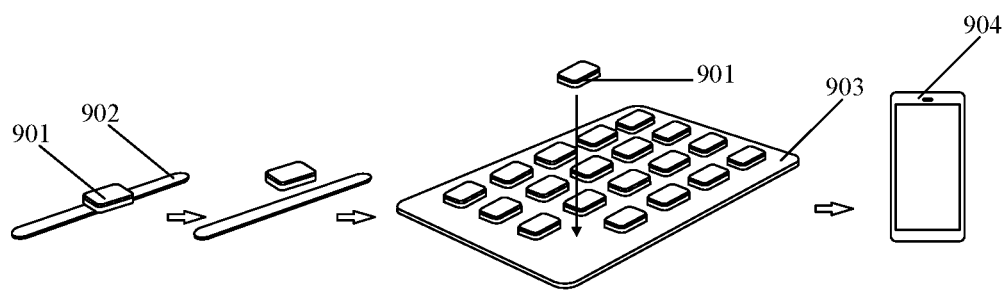
FIG. 9 is a structure diagram of a system for information processing according to some embodiments of the present disclosure.

FIG. 9 is a structure diagram of a system for information processing according to some embodiments of the present disclosure. As shown in FIG. 9, the system for information processing may include: a body 901 of a smart electronic watch, an electronic device 903, and a terminal device 904. The smart electronic watch includes the body 901 and the connector 902. During use, the body 901 may be removed from the connector 901 and arranged in the second accommodating space of the electronic device 903 to establish a communication connection between the body 901 and the electronic device 903. When the communication connection between the body 901 and the electronic device 903 is established successfully, the first prompt message may be sent to the terminal device 904.

In the embodiments of the present disclosure, when the communication connection between the body and the electronic device is established successfully, a first prompt message may be sent to the terminal device bound to the wearable electronic device through the third communication component connected with the third processing component. The first prompt message may be a message representing that the communication connection between the body and the electronic device is successful. In this way, the attendance of a student may be determined based on a state of the communication connection between the body and the electronic device, and the student's situation may be sent to the terminal device bound to the wearable electronic device, which can not only ensure that the student obeys school rules, but also enable the parents to timely know the situation of the student at school.

In some embodiments, the third communication component is further configured to send a second prompt message different from the first prompt message to the terminal device when the communication connection between the electronic device including the third communication component and the body fails to be established.

In some embodiments, the third processing component is further configured to determine at a preset time whether the communication connection between the electronic device and the body is established successfully, and send the second prompt message different from the first prompt message to the terminal device when the communication connection between the electronic device and the body fails to be established. The preset time may be set according to needs, for example, 9:00 am and 2:00 pm.

Still taking the smart electronic watch used by the student for example. A student's class time is fixed, the preset time may be set as the deadline for the student to attend class. If the communication connection between the body of the smart electronic watch and the electronic device is successfully established before the deadline, it means that the student arrives at school on time and has handed over the body of the smart electronic watch to the administrator. If the communication connection between the body of the smart electronic watch and the electronic device fails to be established after the deadline, it means that the student did not hand over the body of the smart electronic watch to the administrator on time. In this case, it can be determined that the student did not arrive at school on time. It is needed to send a second prompt message to the terminal device held by the parents. The second prompt message may be either a message representing that the communication connection between the body and the electronic device fails to be established, or a prompt message representing that the student fails to arrive at school on time generated based on a state that the connection between the electronic device and the body fails.

Figure 10:
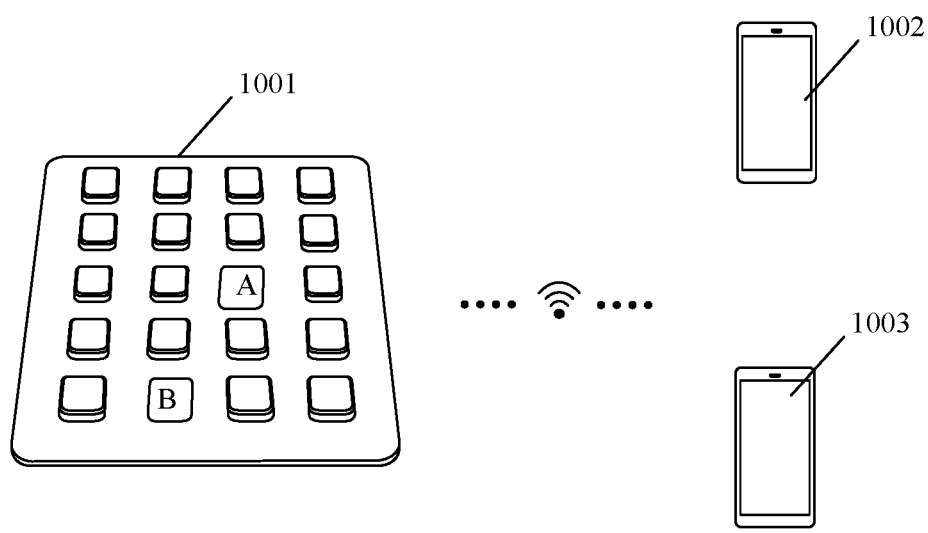
FIG. 10 is a first schematic diagram of interactions between an electronic device and a terminal device according to some embodiments of the present disclosure.

FIG. 10 is a first schematic diagram of interactions between an electronic device and a terminal device according to some embodiments of the present disclosure. As shown in FIG. 10, a second accommodating space A and a second accommodating space B on the electronic device 1001 are empty, which indicates that the bodies of the smart electronic watches of the student A and the student B are not placed in the corresponding second accommodating spaces. In this case, it can be determined that the student A and the student B did not get to school on time, then the electronic device 1001 may send prompt messages respectively to the first terminal device 1002 bound to the smart electronic watch owned by the student A and the second terminal device 1003 bound to the smart electronic watch owned by the student B, so as to inform the parents of the student A and the student B about their failure to arrive at school on time. In an optional embodiment, the electronic device 1001 may send the prompt messages to the first terminal device 1002 and the second terminal device 1003 through a Wi-Fi network.

In these embodiments of the present disclosure, when the communication connection between the body and the electronic device fails to be established, the second prompt message may be sent to the terminal device bound to the wearable electronic device through the third communication component connected with the third processing component. The second prompt message may be a prompt message representing that the student fails to arrive at school on time. In this way, the attendance of student may be determined based on the state of the communication connection between the body and the electronic device, and the student's situation may be sent to the terminal device bound to the wearable electronic device, which can not only ensure that the student obeys school rules, but also enable the parents to timely know the situation of the student at school.

In some embodiments, the third communication component is further configured to send input information received from the body to the terminal device. The input information may be determined by the body based on an input request of an input device acting on the body.

Still taking the smart electronic watch used by the student for example. When the communication connection between the body of the smart electronic watch and the electronic device is established successfully, the body may send information to the electronic device. For example, the body may determine input information based on the input request received by the input device of the body, and send the input information to the electronic device. After receiving the input information, the electronic device may send the input information to the terminal device through the communication connection. The input request may be input by the input device, acting on the body, of the administrator.

Figure 11:
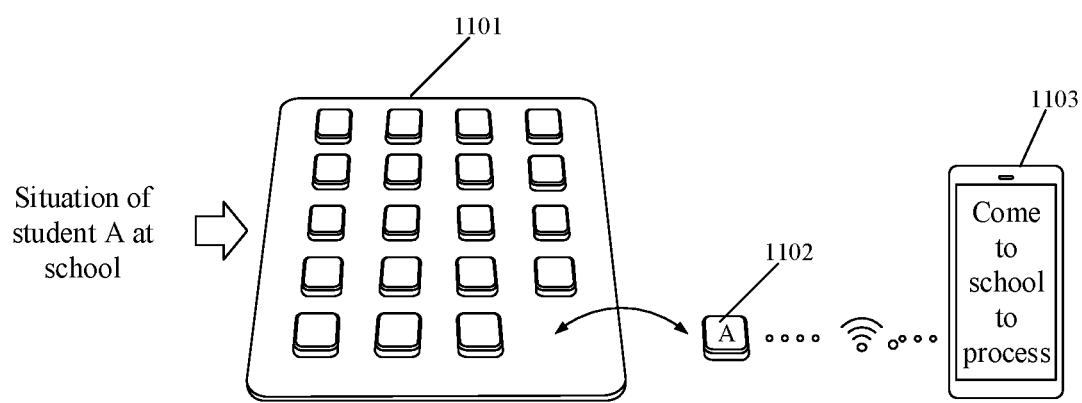
FIG. 11 is a second schematic diagram of interactions between an electronic device and a terminal device according to some embodiments of the present disclosure.

FIG. 11 is a second schematic diagram of interactions between an electronic device and a terminal device according to some embodiments of the present disclosure. As shown in FIG. 11, when an administrator needs to feed back the situation of the student A at school to the parents of the student A, the administrator may input the input information to be sent through the input device of the body 1102 of the student A placed on the electronic device 1101, and send the input information to the terminal device 1103 of the parents of the student A through the electronic device 1101.

In these embodiments of the present disclosure, after the connection establishment between the body and the electronic device is established successfully, a user may send information to the electronic device based on the body and forward the information sent by the body to the terminal device through the electronic device. In this way, when a student is at school, even if the student does not wear the smart electronic watch, the parents can learn about the situation of the student at school from the administrator.

Figure 12:
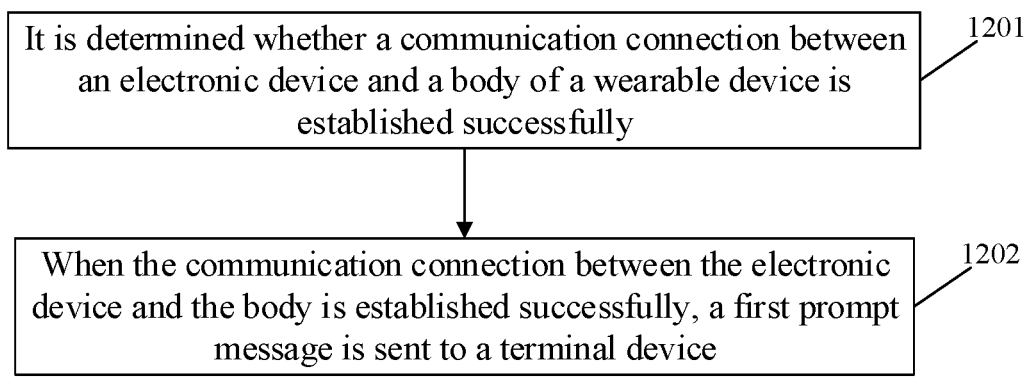
FIG. 12 is a flowchart of a method for information processing according to some embodiments of the present disclosure.

FIG. 12 is a flowchart of a method for information processing according to some embodiments of the present disclosure. As shown in FIG. 12, the method is applied to an electronic device, and may include the following operations.

At operation S1201, it is determined whether a communication connection between an electronic device and a body of a wearable device is established successfully.

At operation S1202, when the communication connection between the electronic device and the body is established successfully, a first prompt message is sent to a terminal device.

Whether the communication connection between the electronic device and the body is established successfully may be determined based on the third processing component of the electronic device. When the communication connection between the electronic device and the body is established successfully, the first prompt message may be sent to the terminal device bound to the wearable electronic device.

In some embodiments, the method may further include that: it is determined whether the electronic device receives the connection request from the body of the wearable electronic device; a request response is sent to the body in response to receiving the connection request; and the communication connection between the body of the wearable electronic device and the electronic device may be established in response to determining that the body receives the request response.

In another optional embodiment, when the communication connection between the electronic device and the body is established based on a first contact point set in the second accommodating space of the electronic device and a second contact point set on the body of the wearable electronic device, whether the first contact point comes into contact with the second contact point may be determined. When the first contact point comes into contact with the second contact point, it can be determined that the communication connection between the electronic device and the body is established successfully.

When the communication connection between the electronic device and the body is established successfully, the first prompt message may be sent to the terminal device bound to the wearable electronic device. Taking that the wearable electronic device is the smart electronic watch used by the student for example. Since school does not allow a student to use a smart electronic watch, the student may remove the body of the smart electronic watch from the first accommodating space of the connector and hand over the body to an administrator after arriving at school. After getting the body, the administrator may place the body in the second accommodating space of the electronic device to establish a communication connection between the body and the electronic device, so that the function of sending the student's situation can also be realized after the body is separated from the connector.

In the embodiments of the present disclosure, when the communication connection between the body and the electronic device is established successfully, a first prompt message may be sent to a terminal device bound to the wearable electronic device. The first prompt message may be a message representing that the communication connection between the body and the electronic device is successful. In this way, the attendance of student may be determined based on the state of the communication connection between the body and the electronic device, and the student's situation may be sent to the terminal device bound to the wearable electronic device, which can not only ensure that the student obeys school rules, but also enable the parents to timely know the situation of the student at school.

In some embodiments, the method may further include that:

when the communication connection between the electronic device and the body fails to be established, a second prompt message different from the first prompt message may be sent to the terminal device.

In some embodiments, the method may further include that: it is determined at a preset time whether the communication connection between the electronic device and the body is established successfully. When the communication connection between the electronic device and the body fails to be established, the second prompt message different from the first prompt message may be sent to the terminal device. The preset time may be set according to needs, for example, 9:00 am and 2:00 pm.

Still taking the smart electronic watch used by the student for example. Since the student's class time is fixed, the preset time may be set as the deadline for the student to attend class. If the communication connection between the body of the smart electronic watch and the electronic device is successfully established before the deadline, it means that the student arrived at school on time and handed over the body of the smart electronic watch to the administrator. If the communication connection between the body of the smart electronic watch and the electronic device fails to be established after the deadline, it means that the student did not handover the body of the smart electronic watch to the administrator on time. In this case, it may be determined that the student did not arrive at school on time, and it is needed to send a second prompt message to the terminal device held by the parents. The second prompt message may be either a message representing that the communication connection between the body and the electronic device fails to be established, or a prompt message representing that the student fails to arrive at school on time generated based on the state that the connection between the electronic device and the body fails.

In these embodiments of the present disclosure, when the communication connection between the body and the electronic device fails to be established, the second prompt message may be sent to the terminal device bound to the wearable electronic device. The second prompt message may be the prompt message representing that the student fails to arrive at school on time. In this way, the attendance of student may be determined based on the state of the communication connection between the body and the electronic device, and the student's situation may be sent to the terminal device bound to the wearable electronic device, which can not only ensure that the student obeys school rules, but also enable the parents to timely know the situation of the student at school.

In some embodiments, the method may further include that:

input information sent by the body is received. The input information may be determined by the body based on the input request of the input device acting on the body; and the input information is sent to the terminal device bound to the wearable electronic device.

Still taking the smart electronic watch used by the student for example. When the communication connection between the body of the smart electronic watch and the electronic device is established successfully, the body may send information to the electronic device. For example, the body may send the input information determined based on the input request of the input device acting on the body to the electronic device. After receiving the input information, the electronic device may send the received input information to the terminal device based on the communication connection. The input request may be input by the input device, acting on the body, of the administrator.

In the embodiments of the present disclosure, after the connection establishment between the body and the electronic device is established successfully, a user may send information to the electronic device based on the body and forward the information sent by the body to the terminal device through the electronic device. In this way, when a student is at school, even if the student does not wear the smart electronic watch, the parents can learn about the situation of the student at school.

In some embodiments, the method may further include that:

based on the state of the communication connection between the electronic device and the body, check-in information is determined, and the check-in information is sent to the check-in system.

The state of the communication connections may include the state that the communication connection between the electronic device and the body is established successfully and the state that the communication connection between the electronic device and the body fails to be established. In the embodiments of the present disclosure, the check-in information may be generated based on the state of the communication connection between the electronic device and the body. For example, when the communication connection between the electronic device and the body is established successfully, first check-in information may be generated, and the first check-in information may represent successful check-in. When the communication connection between the electronic device and the body fails to be established, second check-in information may be generated, and the second check-in information may represent failed check-in. After the check-in information is determined, the determined check-in information may be sent to the check-in system and stored.

Still taking the smart electronic watch used by the student for example. The check-in information of a student may be determined based on the state of connection between the electronic device and the smart electronic watch and sent to the check-in system of school. In this way, information interconnection among the smart electronic watch, the electronic device and the check-in system can be realized, and data transmission and management can be performed, so as to realize function expansion of the smart electronic watch.

In the embodiments of the present disclosure, information interconnection between the wearable electronic device and the check-in system can be realized by establishing the communication connection between the body of the wearable electronic device and the electronic device, determining the check-in information based on the state of the communication connection of the communication connection, sending the check-in information to the check-in system, and taking the electronic device as a transferring device. Compared with the current manual manner of attendance management, it is more intelligent.

Figure 13:
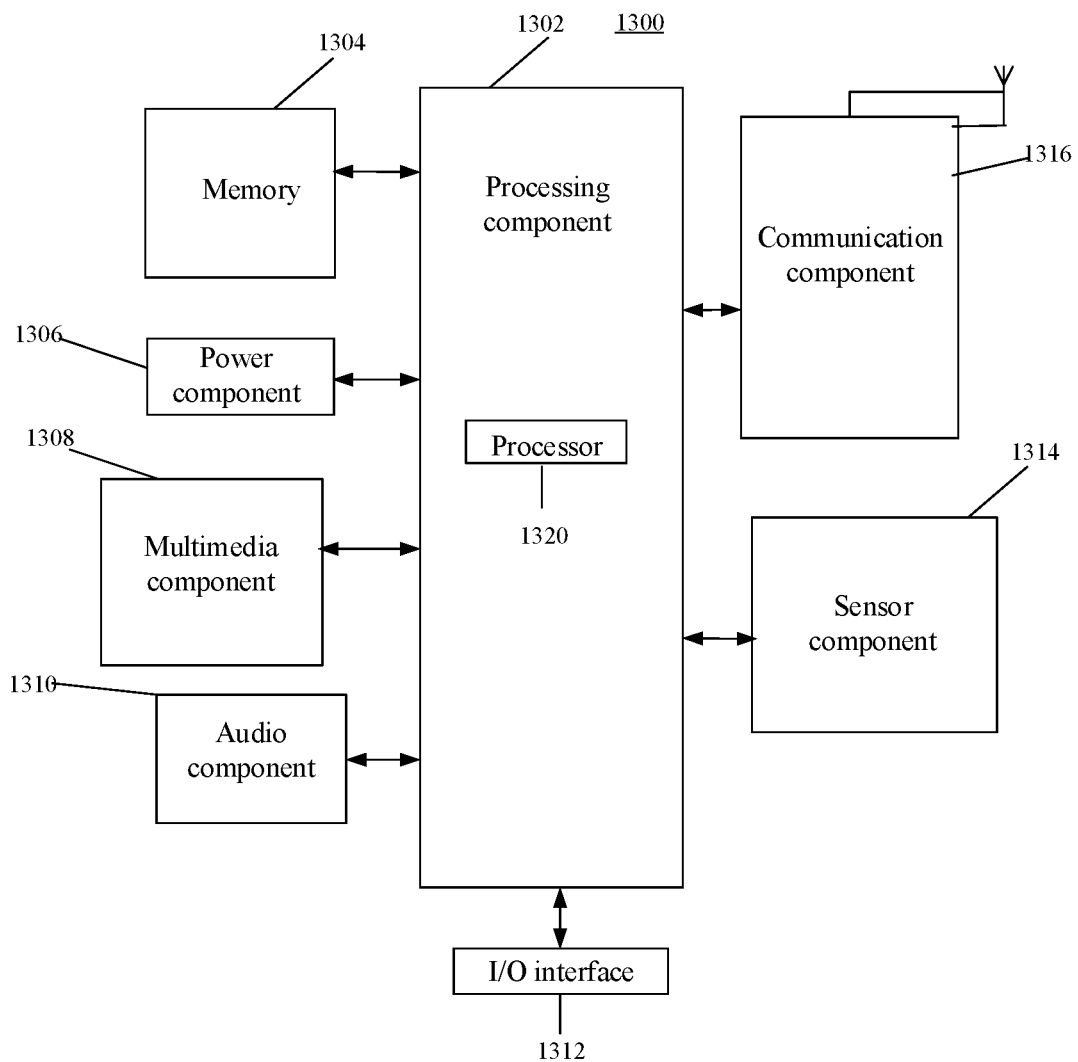
FIG. 13 is a block diagram of a hardware structure of a device for information processing according to some embodiments of the present disclosure.

FIG. 13 is a block diagram of a hardware structure of a device for information processing according to some embodiments of the present disclosure. For example, the device 1300 may be a mobile phone, a computer, a digital broadcast terminal, a messaging device, a gaming console, a tablet, a medical device, exercise equipment and a personal digital assistant.

Referring to FIG. 13, the device 1300 may include one or more of the following components: a processing component 1302, a memory 1304, a power component 1306, a multimedia component 1308, an audio component 1310, an Input/Output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above method. Moreover, the processing component 1302 may include one or more portions which facilitate interaction between the processing component 1302 and the other components. For instance, the processing component 1302 may include a multimedia portion to facilitate interaction between the multimedia component 1308 and the processing component 1302.

The memory 1304 is configured to store various types of data to support the operation of the device 1300. Examples of such data include instructions for any application programs or methods operated on the device 1300, contact data, phonebook data, messages, pictures, video, etc. The memory 1304 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1306 is configured to provide power for various components of the device 1300. The power component 1306 may include a power management system, one or more power supplies, and other components associated with generation, management and distribution of power for the device 1300.

The multimedia component 1308 may include a screen providing an output interface between the device 1300 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1310 is configured to output and/or input an audio signal. For example, the audio component 1310 includes a Microphone (MIC), and the MIC is configured to receive an external audio signal when the device 1300 is in the operation mode, such as a call mode, a recording mode and a voice recognition mode. The received audio signal may further be stored in the memory 1304 or sent through the communication component 1316. In some embodiments, the audio component 1310 further includes a speaker configured to output the audio signal.

The I/O interface 1312 is configured to provide an interface between the processing component 1302 and a peripheral interface component. The peripheral interface component may be a keyboard, a click wheel, a button, etc. The button may include, but not limited to: a home button, a volume button, a starting button and a locking button.

The sensor component 1314 may include one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and another device. The device 1300 may access a communication-standard-based wireless network, such as WI-FI, 2G, 3G, 4G, 5G network or a combination thereof. In some embodiments of the present disclosure, the communication component 1316 receives a broadcast signal or broadcast associated information from an external broadcast management system through a broadcast channel. In some embodiments of the present disclosure, the communication component 1316 further includes an NFC portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In some embodiments of the present disclosure, there is also provided a non-transitory computer-readable storage medium storing instructions, such as the memory 1304 storing instructions, and the instructions may be executed by the processor 1320 of the device 1300 to implement the abovementioned method. For example, the non-temporary computer-readable storage medium may be a Read-Only Memory (ROM), a Random-Access Memory (RAM), a Compact Disc Read-Only Memory (CD-ROM), a magnetic tape, a floppy disc, an optical data storage device and the like.

A non-transitory computer-readable storage medium is provided. When instructions in the storage medium are executed by the processor of the device for information processing, the device for information processing can perform the information management method. The method is applied to an electronic device, and may include the following operations.

It is determined whether a communication connection between the electronic device and a body of a wearable device is established successfully.

When the communication connection between the electronic device and the body is established successfully, a first prompt message is sent to the terminal device.

The technical solutions provided in the embodiments of the present disclosure may have the following beneficial effects.

It can be seen from the above embodiments that, a first accommodating space may be set on a connector of a wearable electronic device to accommodate a body of the wearable electronic device. In the first aspect, the connector can form a wearing ring separately after the body is removed, therefore, the connector can be normally worn even if the body is removed from the first accommodating space on the connector. In the second aspect, the body has the first communication component, the connector has the second communication component, and the first communication component and the second communication component are independent of each other, therefore, the body and the connector can work normally as two independent parts even if the body and the connector are separated. In the third aspect, users can decide to carry the body and/or the connector according to different application scenarios, which can improve the flexibility of using the wearable electronic device and thus improve the user experience.

The various device components, modules, circuits, units, blocks, or portions may have modular configurations, or are composed of discrete components, but nonetheless can be referred to as "modules" or "portions" etc. in general. In other words, the "components," "modules," "circuits," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A wearable electronic device, comprising:
   a body, comprising a display component, where a display area of the display component is on a surface of the body and is configured to output display contents; and
   a connector, having an accommodating space,
   wherein when the body is fixed with the connector, the body is in the first accommodating space of the connector;
   the connector is capable of forming a wearing ring;
   when the accommodating space of the connector is empty, the body is separated from the connector;
   a first communication component is arranged in the body and is configured for communication between the body and external devices, wherein the first communication component is further configured to automatically establish a communication connection between the body and a first external device when the body is in an accommodating space on the first external device, and the body further comprises: a first processing component, configured to automatically switch the body from a first operating mode to a second operating mode after the body establishes the communication connection with the first external device; and wherein the body is configured to perform no entertainment function in the second operating mode, and the body is configured to perform an entertainment function in the first operating mode; and
   a second communication component is arranged in the connector and is independent of the first communication component, the second communication component being for communication between the connector and external devices.

2. The wearable electronic device of claim 1, wherein, the first processing component is further configured to switch the body from the second operating mode to the first operating mode after determining that the communication connection between the body and the first external device is disconnected.

3. The wearable electronic device of claim 1, wherein the second communication component is further configured to establish a communication connection between the connector and a second external device when a distance between the connector and the second external device is less than a preset distance threshold.

4. The wearable electronic device of claim 3, wherein the second communication component comprises:
   a Near Field Communication (NFC) chip, configured to simulate the connector into an NFC card, where the NFC card is configured to perform NFC between the NFC card and a card reading device.

5. An electronic device, comprising:
   a plurality of accommodating spaces, each accommodating space configured to accommodate a body of a wearable electronic device; and
   a third communication component, configured to establish a communication connection with the body when the body is arranged in the accommodating space,
   wherein the body comprises a display component, where a display area of the display component is on a surface of the body and is configured to output display contents;
   the wearable electronic device further comprises a connector, wherein the connector has an accommodating space and is capable of forming a wearing ring;
   when the body is fixed with the connector, the body is in the accommodating space of the connector;
   when the accommodating space of the connector is empty, the body is separated from the connector;
   a first communication component is arranged in the body and is configured for communication between the body and external devices, wherein the first communication component is further configured to automatically establish a communication connection between the body and a first external device when the body is in an accommodating space on the first external device, and the body further comprises: a first processing component, configured to automatically switch the body from a first operating mode to a second operating mode after the body establishes the communication connection with the first external device; and the body is configured to perform no entertainment function in the second operating mode, and the body is configured to perform an entertainment function in the first operating mode; and a second communication component is arranged in the connector and is independent of the first communication component, the second communication component being for communication between the connector and external devices.

6. The electronic device of claim 5, further comprising:
a third processing component, configured to determine whether the communication connection between the electronic device comprising the third communication component and the body is established successfully; and the third communication component is connected with the third processing component, and is further configured to send a first prompt message to a terminal device bound to the wearable electronic device when the communication connection between the electronic device comprising the third communication component and the body is established successfully.

7. The electronic device of claim 6, wherein,
the third communication component is further configured to send a second prompt message different from the first prompt message to the terminal device when the communication connection between the electronic device comprising the third communication component and the body fails to be established.

8. The electronic device of claim 6, wherein,
the third communication component is further configured to send input information received from the body to the terminal device, where the input information is determined by the body based on an input request of an input device acting on the body.

9. A method for information processing, which is applicable to an electronic device, the method comprising:
determining whether a communication connection between the electronic device and a body of a wearable device is established successfully; and
when the communication connection between the electronic device and the body is established successfully, sending a first prompt message to a terminal device, wherein the electronic device comprises:
a plurality of accommodating spaces, each accommodating space configured to accommodate the body of the wearable electronic device; and
a third communication component, configured to establish the communication connection with the body when the body is arranged in the accommodating space,
wherein the body comprises a display component, where a display area of the display component is on a surface of the body and is configured to output display contents;
the wearable electronic device further comprises a connector, wherein the connector has an accommodating space and is capable of forming a wearing ring;
when the body is fixed with the connector, the body is in the accommodating space of the connector;
when the accommodating space of the connector is empty, the body is separated from the connector;
a first communication component is arranged in the body and is configured for communication between the body and external devices, wherein the first communication component is further configured to automatically establish a communication connection between the body and a first external device when the body is in an accommodating space on the first external device, and the body further comprises: a first processing component, configured to automatically switch the body from a first operating mode to a second operating mode after the body establishes the communication connection with the first external device; and the body is configured to perform no entertainment function in the second operating mode, and the body is configured to perform an entertainment function in the first operating mode; and
a second communication component is arranged in the connector and is independent of the first communication component, the second communication component being for communication between the connector and external devices.

10. The method of claim 9, further comprising:
when the communication connection between the electronic device and the body fails to be established, sending a second prompt message different from the first prompt message to the terminal device.

11. The method of claim 9, further comprising:
receiving input information from the body, where the input information is determined by the body based on an input request of an input device acting on the body; and
sending the input information to the terminal device bound to the wearable electronic device.

12. The method of claim 9, further comprising:
determining check-in information based on a state of the communication connection between the electronic device and the body; and
sending the check-in information to a check-in system.

13. A non-transitory computer-readable storage medium, having stored instructions therein that, when executed by a processor of an electronic device, cause the electronic device to implement the method for information processing of claim 9.

14. The non-transitory computer-readable storage medium of claim 13, wherein the processor is further configured to execute the instructions to cause the electronic device to implement steps of:
when the communication connection between the electronic device and the body fails to be established, sending a second prompt message different from the first prompt message to the terminal device.

15. The non-transitory computer-readable storage medium of claim 13, wherein the processor is further configured to execute the instructions to cause the electronic device to implement steps of:
receiving input information from the body, where the input information is determined by the body based on an input request of an input device acting on the body; and
sending the input information to the terminal device bound to the wearable electronic device.

16. The non-transitory computer-readable storage medium of claim 13, wherein the processor is further configured to execute the instructions to cause the electronic device to implement steps of:
determining check-in information based on a state of the communication connection between the electronic device and the body; and
sending the check-in information to a check-in system.

17. The wearable electronic device of claim 1, wherein the connector is configured to form a wearing ring independently after the body is removed to thereby be worn by a user even if the body is removed from the accommodating space of the connector.

18. The wearable electronic device of claim 17, wherein the body and the connector are configured to function normally as two independent parts upon separation of the body and the connector, to thereby be carried or worn by the user separately.

* * * * *